US012578047B2

(12) United States Patent
Guillard

(10) Patent No.: US 12,578,047 B2
(45) Date of Patent: Mar. 17, 2026

(54) ASEPTIC JUNCTION DEVICE FOR A TUBE

(71) Applicant: PARKER HANNIFIN EMEA SARL, Etoy (CH)

(72) Inventor: Philippe Guillard, Saint-Gregoire (FR)

(73) Assignee: PARKER HANNIFIN EMEA SARL, Etoy (CH)

( * ) Notice: Subject to any disclaimer, the term of this patent is extended or adjusted under 35 U.S.C. 154(b) by 131 days.

(21) Appl. No.: 18/645,468

(22) Filed: Apr. 25, 2024

(65) Prior Publication Data

US 2024/0360937 A1 Oct. 31, 2024

(30) Foreign Application Priority Data

Apr. 28, 2023 (FR) ...................................... 2304361

(51) Int. Cl.
*F16L 37/098* (2006.01)

(52) U.S. Cl.
CPC ....... *F16L 37/0982* (2013.01); *F16L 2201/44* (2013.01)

(58) Field of Classification Search
CPC . F16L 2201/44; F16L 25/0018; F16L 37/084; F16L 37/0982; A61M 60/89; A61M 60/896; A61M 60/892; A61M 2039/2433; A61M 2039/244; A61M 2039/2446; A61M 2039/246
See application file for complete search history.

(56) References Cited

U.S. PATENT DOCUMENTS

| | | | | |
|---|---|---|---|---|
| 6,068,303 | A * | 5/2000 | Hollnagle | F16L 37/098 |
| | | | | 285/233 |
| 11,415,255 | B1 * | 8/2022 | Stierns | F16L 37/38 |
| 2010/0230950 | A1 * | 9/2010 | Williams | A61M 39/18 |
| | | | | 285/38 |
| 2011/0240158 | A1 * | 10/2011 | Py | F16L 41/02 |
| | | | | 29/428 |
| 2015/0028586 | A1 * | 1/2015 | Gerst | A61M 39/1011 |
| | | | | 285/352 |
| 2018/0296817 | A1 | 10/2018 | Burdge | |
| 2022/0252194 | A1 * | 8/2022 | Benson | A61M 39/18 |

(Continued)

FOREIGN PATENT DOCUMENTS

FR 3117569 A1 6/2022

OTHER PUBLICATIONS

Preliminary Search Report issued for corresponding French Patent Application No. 2304361, mailed Dec. 13, 2023.

*Primary Examiner* — Matthew Troutman
*Assistant Examiner* — James A Linford
(74) *Attorney, Agent, or Firm* — Renner, Otto, Boisselle & Sklar, LLP

(57) ABSTRACT

An aseptic junction device for a tube includes a tubular insert having a first end segment and a second end segment, an annular body mounted on the second end segment of the insert, and an annular sealing element. A maneuvering sleeve is rotatably mounted between a connection position and a disconnection position, and is coupled to the insert so that a rotation of the sleeve from the connection position to the disconnection position leads an axial movement of the body from a projecting position to a flush position. A coupling is arranged to allow decoupling of the junction device and another junction device, only when the sleeve is in the disconnection position.

9 Claims, 15 Drawing Sheets

(56)        References Cited

U.S. PATENT DOCUMENTS

| | | | |
|---|---|---|---|
| 2022/0381384 A1* | 12/2022 | Coscia | F16L 37/098 |
| 2023/0122306 A1 | 4/2023 | Benson et al. | |
| 2024/0044428 A1 | 2/2024 | Le Quere | |
| 2025/0137566 A1* | 5/2025 | Coulson | F16L 37/098 |

* cited by examiner

ASEPTIC JUNCTION DEVICE FOR A TUBE

The present invention relates to the field of transporting liquid or gaseous fluids, and more particularly to an aseptic junction device for coupling together two sterile tubes.

BACKGROUND OF THE INVENTION

Junction assemblies are known for connecting together sterile pipes that are connected to circuit elements in the pharmaceutical industry, such as filters, centrifuges, pumps, tanks made of flexible plastics material, or processing containers such as bio-processors.

Such an assembly generally comprises two junction devices for connecting together after each of them has been attached to a respective pipe end. Each device comprises a tubular body defining a channel arranged to receive the pipe end. The body has a front face with an annular sealing element securely fastened thereto and with which the pipe end is intended to come into leaktight contact. The sealing element is covered in a protective film in the form of a strip that is folded in half with one portion removably adhering to a free side flank of the sealing element and with another portion forming a tongue projecting from the first portion.

After the pipe ends have been engaged in the bodies, the devices are placed facing each other on the same axis, and they are then moved towards each other until the protective films come into contact and the sealing elements are lightly compressed. Removing the protective films simultaneously by pulling on the tongues causes the lateral flanks of the sealing elements to be put into sealed contact with each other, and thus causes an aseptic channel to be formed for passing fluid between the two pipes. The devices are moved closer together prior to locking the relative positions of the devices by means of a clamp.

At the end of the process of manufacturing a batch of pharmaceuticals, all of the pipes and the coupling devices are generally removed and incinerated. Reconditioning them (washing, sterilizing, etc.) is found to be expensive and runs the risk of damaging the devices (wear, breakage, or even loss of a component).

Nevertheless, it is found that such devices have numerous components, making them particularly expensive for single use only. It would also be desirable to limit, or even eliminate, any flow of fluid remaining trapped in the pipes while the devices are being disconnected.

For this purpose, document FR-A-3117569 envisages equipping the junction devices with a sealing element making it possible both to ensure the sealing of the junction of the tube and to completely obstruct the channel before disconnection. However, it is possible, with such devices, to disconnect them without having previously obstructed the channels by the sealing elements, so that human error is possible.

AIM OF THE INVENTION

The invention therefore aims to propose an aseptic junction device for a tube enabling to obviate, at least partially, the abovementioned problems.

SUMMARY OF THE INVENTION

To this end, the invention provides an aseptic junction device for a tube, the device comprising:
- a tubular insert defining a channel and having a first end segment provided with means for connecting it to the tube and a second end segment which is intended to extend outside the tube;
- an annular body comprising a first end segment mounted on the second end segment of the insert, and a second end segment projecting axially from said second end segment of the insert to define therewith a housing;
- a sealing element that is disposed in the housing between a front face of the second end section of the insert and an internal step of the second segment of the annular body and that is deformable from a first state in which the sealing element delimits a fluid flow section and a second state in which the sealing element completely obstructs the channel, the sealing element being arranged to be brought from its first state to its second state under the effect of an axial compression; and
- means for coupling to another junction device.

The first end segment of the body is mounted on the insert so as to be movable axially between a projecting position of the insert in which the sealing element is in its first state, and a flush position with the insert in which the sealing element is sufficiently compressed axially to be in its second state.

According to the invention:
- a maneuvering sleeve is rotatably mounted on the body between a connection position and a disconnection position, and is coupled to the insert to axially move the body from the projecting position to the flush position in response to a rotation of the sleeve from the connection position to the disconnection position; and
- the coupling means are arranged to allow decoupling of the junction device and of the other junction device only when the sleeve is in the disconnection position.

Thus, it is necessary to bring the maneuvering sleeve into the disconnection position, and therefore to obstruct the channel by the sealing element to decouple the devices from each other, so that any risk of human error is limited.

In particular, the device comprises means for locking the body in a flush position.

In particular, the sealing element has a front face projecting from the second segment of the annular body on which a protective film is removably fastened, the film having a pull-tongue folded down thereon, having a first end connected to an edge of the protective film and a second end projecting from the edge of the film that is opposite from the first end of the pull-tongue.

Thus, the sealing element serves both to seal the junction of the tube and to completely obstruct the channel, and thus to limit the number of components of the device.

In particular, the first end segment of the body comprises a locking tab projecting from a front face of the body and including, at a free end, a serration intended to co-operate with an edge of the other junction device, and one end of the sleeve is provided on the outside with at least one collar portion intended to co-operate with a locking tab of the other junction device, the collar portion and the locking tab forming the locking means.

In particular, the tubular insert is provided with a rod extending axially cantilevered into the channel to have a free end portion projecting from the second end section of the insert. The fluid flow section delimited by the sealing element in its first state is then greater than a cross-section of the rod and the sealing element in its second state encloses the rod.

In particular, the rotation of the sleeve from the connection position to the disconnection position is substantially equal to 180 degrees.

The invention also provides an assembly for the junction of two tubes together comprising two such junction devices.

Advantageously, the two junction devices are identical.

The invention also provides a method for disconnecting two tubes joined by means of such a junction assembly, the method comprising the following steps:

bringing the sleeves of the two devices from the connection position to the disconnection position; and axially moving the devices away from each other.

BRIEF DESCRIPTION OF THE DRAWINGS

The invention will be best understood in the light of the following description, which is purely illustrative and non-limiting, and should be read with reference to the accompanying drawings, in which.

DETAILED DESCRIPTION OF THE INVENTION

Figure 1:
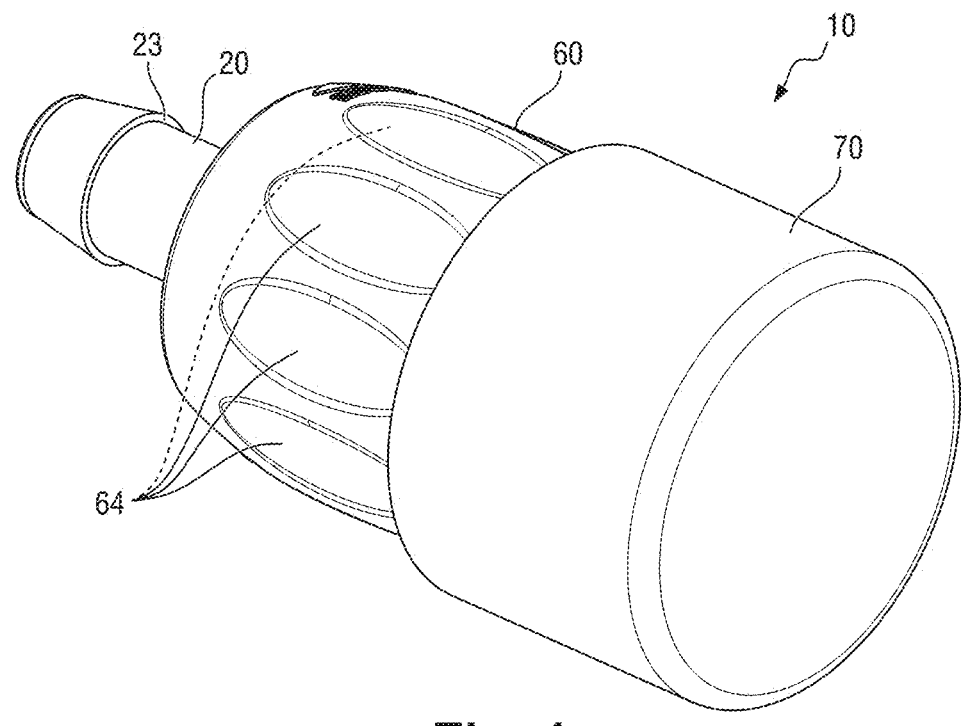
FIG. 1 is a perspective view of a junction device in a particular embodiment of the invention.
Figure 2:
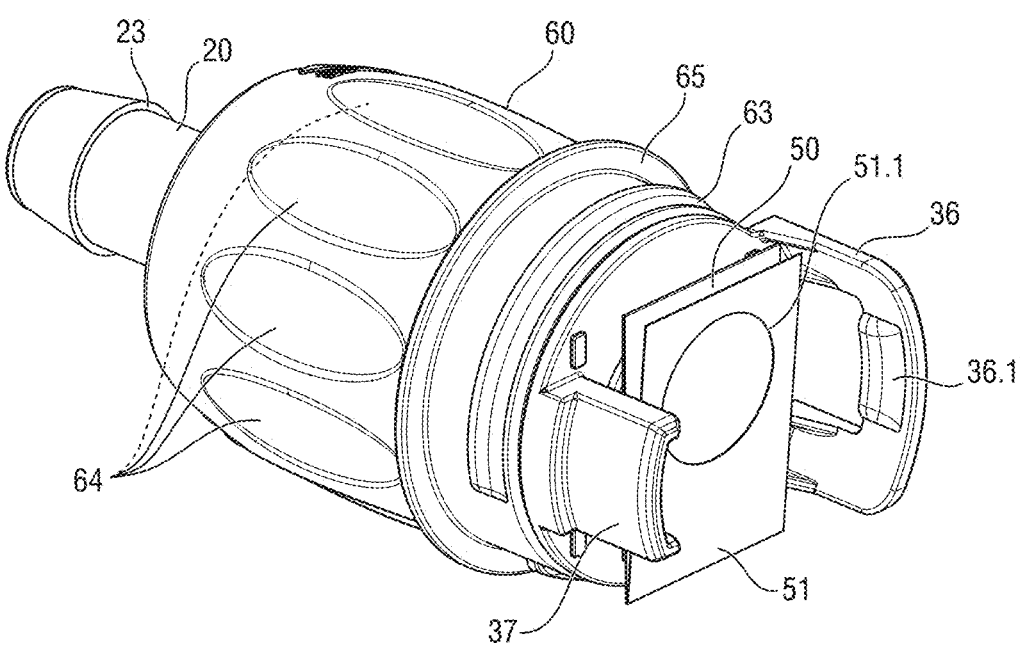
FIG. 2 is a view similar to FIG. 1, wherein the junction device has no protective cover.

The invention is, in this case, described in application to coupling together a first sterile tube 100 forming a first fluid transport duct and a second fluid transport duct formed by a second sterile tube 200.

With reference to FIGS. 6A to 10B, according to a first particular embodiment of the invention, a fluid junction assembly given overall reference 1 comprises two junction devices 10 intended to provide together an aseptic connection between the first tube 100 and the second tube 200. The two devices 10 are identical, and in the figures, they are distinguished by adding a letter A or B.

As shown in FIGS. 1 to 5, each device 10 comprises a tubular endpiece or insert 20 defining a fluid flow channel 21.

The insert 20 has a first end segment 20.1 defining a first bore 22.1 forming a first portion of the channel 21. The first segment 20.1 has a conically-shaped external projection 23 and a collar 24, respectively forming a spigot for anchoring it in the tube 100 or 200, and an abutment for stopping insertion into said tube 100 or 200.

Figure 4:
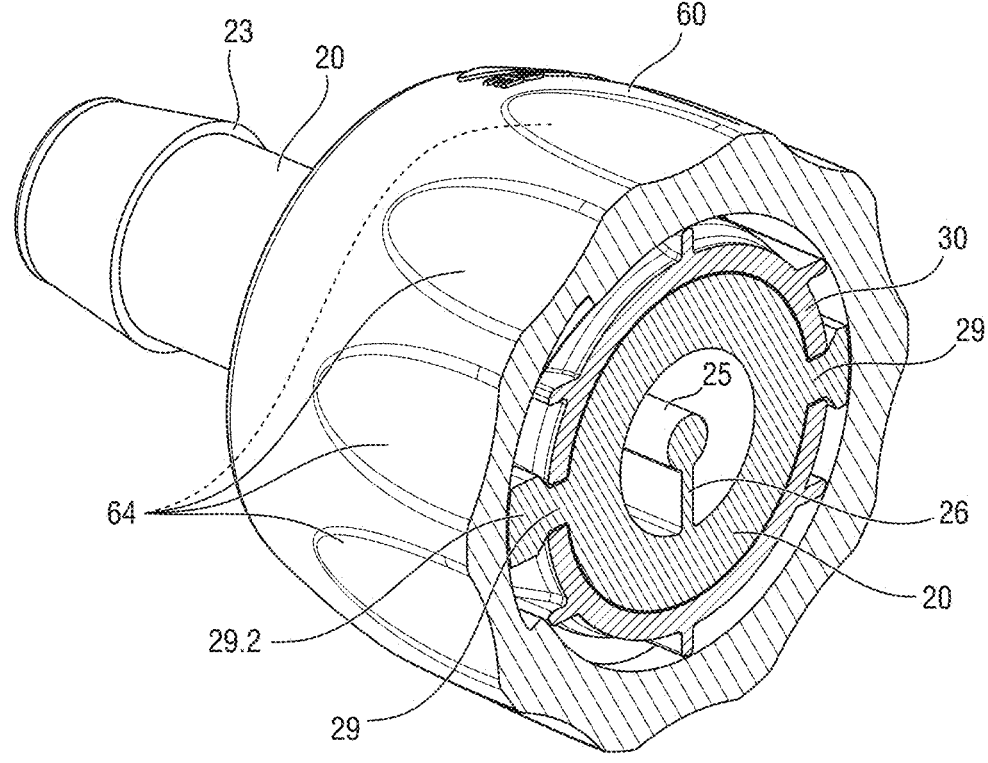
FIG. 4 is a cross-section view of the junction device shown in FIG. 2.
Figure 5:
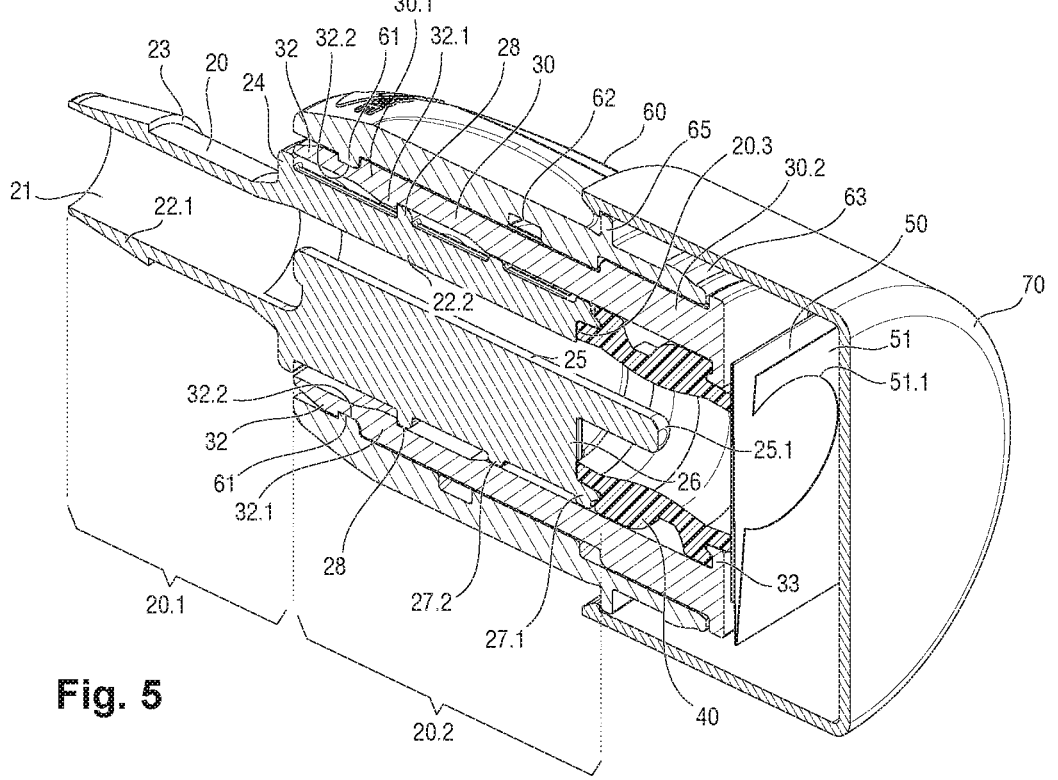
FIG. 5 is an axial section view of the junction device shown in FIG. 2.

The insert 20 has a second end segment 20.2 defining a second bore 22.2 coaxial to the first bore 22.1 and forming a second portion of the channel 21. The second segment 20.2 is provided internally with a cantilevered rod 25 of cylindrical shape extending axially inside the channel 21 so that a free end portion 25.1 of the rod projects out from the second segment 20.2 of the insert 20. As shown in FIGS. 4 and 5, the rod 25 is axially connected to the second bore 22.2 by an axially extending web 26. The diameter of the rod 25 is here sufficiently low such that the fluid flow section of the channel 21 is here substantially identical in the first segment 20.1 and in the second segment 20.2.

The second segment 20.2 of the insert 20 is provided externally with two coaxial collars 27.1, 27.2 arranged at a free end of said second segment 20.2, and with a detent ring 28 having an outside diameter slightly greater than that of the collars 27.1, 27.2. The collars 27.1, 27.2 form first means for centering a tubular body 30 mounted on the insert 20. The detent ring 28 forms a second means for centering the body 30 on the insert 20 and, as will be seen later, a means for axially locking the body 30 in position on the insert 20.

The second segment 20.2 of the insert 20 is also provided externally with two diametrically opposite axial ribs 29 arranged, as will be seen below, to connect in rotation the body 30 to the insert 20. The ribs 29 have lateral faces comprising recesses arranged to form stopping flanks 29.1 of the body on the insert 20.

The body 30 has a first end segment 30.1 mounted on the second segment 20.2 of the insert 20, and a second end segment 30.2 projecting axially from said second segment 20.2 of the insert 20.

Figure 3:
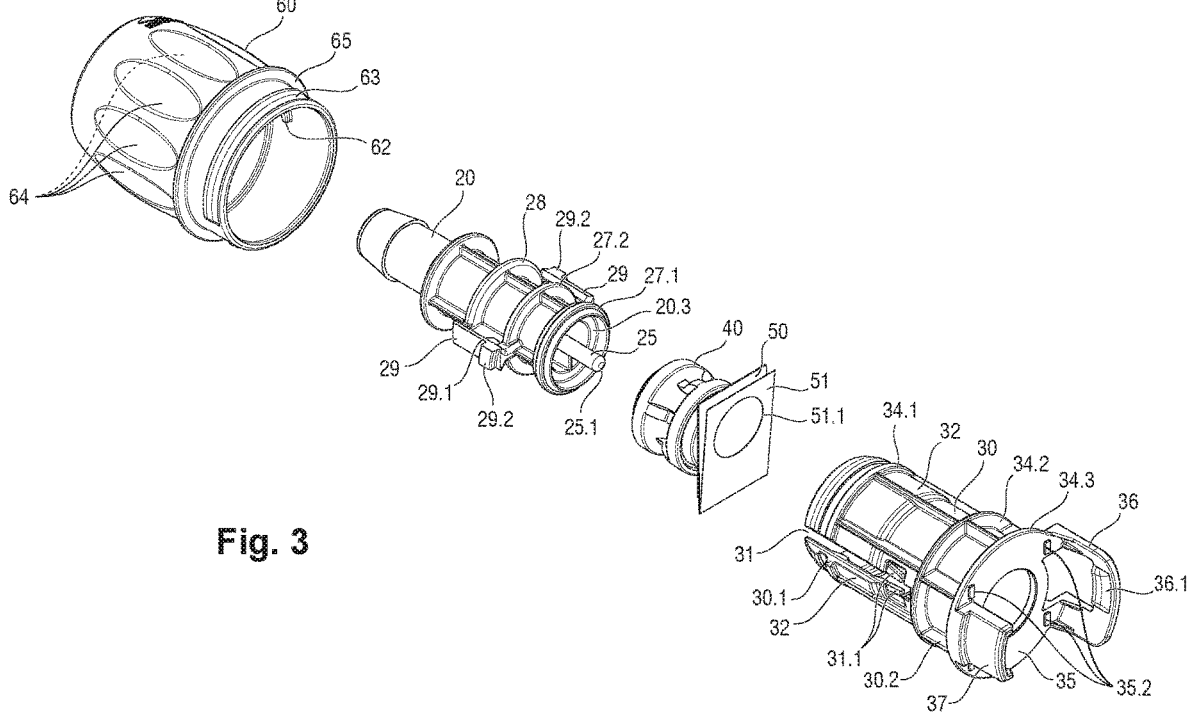
FIG. 3 is an exploded view of the junction device shown in FIG. 2.

As shown in FIG. 3, the first segment 30.1 has two axial slots 31 opening onto a free edge of the first segment 30.1 to delimit between them two diametrically opposed cylindrical portions 32. The cylindrical portions 32 each have one end secured to the rest of the first segment 30.1 and an opposite end comprising an internal projection 32.1 cooperating with a lateral flank of the detent ring 28, and an external annular groove 32.2 arranged, as will be seen later, to connect the body 30 in translation to a maneuvering sleeve 60 mounted on said body 30. The slots 31 delimiting the cylindrical portions 32 are arranged to receive the ribs 29 of the insert 20 so as to connect in rotation the body 30 to the insert 20 and to ensure an axial movement of the body 30 on the insert 20. The cylindrical portions 32 are elastically deformable between a rest state in which the projections 32.1 define a flow section smaller than the diameter of the detent ring 28 and a first deformed state in which said projections 32.1 define a flow section greater than the diameter of said detent ring 28. It should be noted that the detent ring 28 has an outer periphery comprising a chamfer arranged to not hinder the mounting of the body 30 on the insert 20.

The slots 31 delimiting the cylindrical portions 32 also comprise a segment delimited by two elastically deformable arms 31.1 between a rest state in which the arms 31.1 delimit a flow section less than a width of the ribs 29 of the insert 20, and a deformed state in which said arms 31.1 delimit a flow section greater than the width of said ribs 29.

The ribs 29 comprise a front face arranged not to oppose, overall, an axial movement of the body 30 from a projecting position, in which the projections 32.1 of the cylindrical portions 32 cooperate with the lateral flank of the detent ring 28 and in which the arms 31.1 are axially distant from the ribs 29 (FIGS. 5, 6B, 7B, 8B), towards a flush position with the insert 20, in which a free end of the arms 31.1 cooperate in the rest state with the stopping flanks 29.1 formed on the lateral faces of the ribs 29 (FIGS. 9B and 10B) so as to oppose an axial movement of the body 30 from the flush position towards the projecting position. It will be understood that after joining the flush position, the body 30 can no longer return to the projecting position.

The second segment 30.2 of the body 30 defines, with the second segment 20.2 of the insert 20, facing the end portion 25.1 of the rod 25, a housing for receiving an annular sealing element 40 that is placed between the front face 20.3 of the second segment 20.2 and an internal annular step 33 of the second segment 30.2 arranged at a free end of said second segment 30.2.

The first segment 30.1 and the second segment 30.2 of the body 30 are each provided externally with a collar 34.1, 34.2 forming means for centering the sleeve 60 on the body 30. The second segment 30.2 is also provided with another collar 34.3 which extends radially in line with the step 33 to define therewith a front face 35 of the body 30. The collars 34.1, 34.2, 34.3 are coaxial and the front face 35 of the body 30 is provided with four studs 35.2 each delimiting a contact surface intended to cooperate axially with a contact surface of a stud 35.2 of another device 10 to guarantee, as will be seen later, a slight clearance between the front faces 35 after the two devices 10 have been moved closer together.

The body 30 further comprises a locking tab 36 and an assembly pin 37 that are diametrically opposite and that project axially from the front face 35 of the body 30, in the vicinity of a periphery thereof.

The locking tab 36 is elastically deformable and comprises a free end having an inner surface provided with a conically-shaped serration 36.1 intended to ensure, as will be seen later, a coupling of the device 10 with the other device 10.

The front face 35 of the body 30 comprises a slot 35.1 intended to receive a portion of the assembly pin 37 of the other device 10. The slot 35.1 is arranged in the vicinity of a periphery of the front face 35, in the vicinity of the locking tab 36, the slot 35.1 and the assembly pin 37 being diametrically opposite.

The sealing element 40 is in leaktight contact with the front face 20.3 of the second segment 20.2 of the insert 20 and with an inside flank of the step 33 facing said front face 20.3. The sealing element 40 is deformable from a first state in which it defines a flow section greater than the cross-section of the rod 25 of the insert 20, and a second state in which it encloses the rod 25, and is arranged to be taken from its first state to its second state under the effect of axial compression. Such a sealing element is known from Document EP2569665.

When the body 30 is moved axially from its projecting position to its flush position, the insert 20 compresses the sealing element 40 hard enough against the step 33 to take it from its first state to its second state.

The sealing element 40 has a front face projecting from the second segment 30.2 of the body 30 and on which a protective film 50 is removably fastened, the protective film 50 having a pull-tongue 51 folded down onto it to enable the protective film 50 to be removed without being touched. The pull-tongue 51 has a first end connected to one edge of the protective film 50, and a second end projecting from an edge of the protective film 50 opposite to the first end of the tongue 51. In its center, the second end of the tongue 51 has a hole 51.1 shaped to allow a finger to pass through said hole 51.1 in order to make the tongue 51 easier to grip, forming a pulling ring.

The sleeve 60 internally comprises an annular step 61 received in the outer grooves 32.2 of the cylindrical portions 32 of the body 30 so that the body 30 is connected in translation to the sleeve 60.

The cylindrical portions 32 are elastically deformable between their rest state in which the free end of the cylindrical portions 32 delimits a flow section greater than the diameter of the step 61, and a second deformed state in which said free end delimits a flow section less than the diameter of said step 61. It should be noted that the free end of the cylindrical portions 32 has an outer periphery comprising a chamfer arranged not to hinder the mounting of the sleeve 60 on the body 30.

The sleeve 60 also internally comprises a helical slot 62 forming a thread arranged to receive projections 29.2 projecting radially from the ribs 29 of the insert 20 so that an axial rotation of the maneuvering sleeve 60 from a connection position to a disconnection position causes an axial movement of the insert 20 from the projecting position to the flush position. The rotation angle of the sleeve 60 from the connection position to the disconnection position is in this case substantially equal to 180 degrees.

The sleeve 60 comprises an end provided externally with two identical and diametrically opposite collar portions 63, on which the locking tab 36 of the body 30 of the other device 10 is intended to clip via its conically-shaped serration 36.1 to ensure a coupling of the device 10 with said other device 10, the sleeve 60 of which is in the connection position. The collar portions 63 are angularly spaced so as to define an axial clearance path for the locking tab 36 of the other device 10 when the sleeve 60 is in the disconnection position.

The sleeve 60 also externally comprises a plurality of recesses 64 distributed angularly in regular manner to form means for gripping the sleeve 60 in order to facilitate its rotation.

In order to avoid any deterioration or contamination of the protective film 50 and contamination of the sealing element 40 during storage and transport of the device 10, a protective cover 70 is removably mounted on the end of the sleeve 60. The cover 70 is in this case arranged to clip (by resilient snap) on a external annular step 65, and is intended to be taken off immediately before coupling the device 10 to the other device 10.

It should be noted that the entire device 10 is sterilized in the factory so as to be exempt from any contamination before being stored.

The operation of the junction assembly 1 will now be described with reference to FIGS. 6A to 10B.

The end segment 20.1 of the first device 10A is initially engaged in the first tube 100 until it comes into abutment against the collar 24 of said first device 10A. Likewise, the end segment 20.1 of the second device 10B is engaged in the second tube 200 until it comes into abutment against the collar 24 of said second device 10B, such that the first and second devices 10A, 10B are anchored respectively in the first and second tubes 100, 200.

The protective covers 70 of the first and second devices 10A, 10B are then removed from the sleeves 60, thereby revealing in particular the locking tabs 36 and the assembly pins 37 of said bodies 30.

Figure 6A:
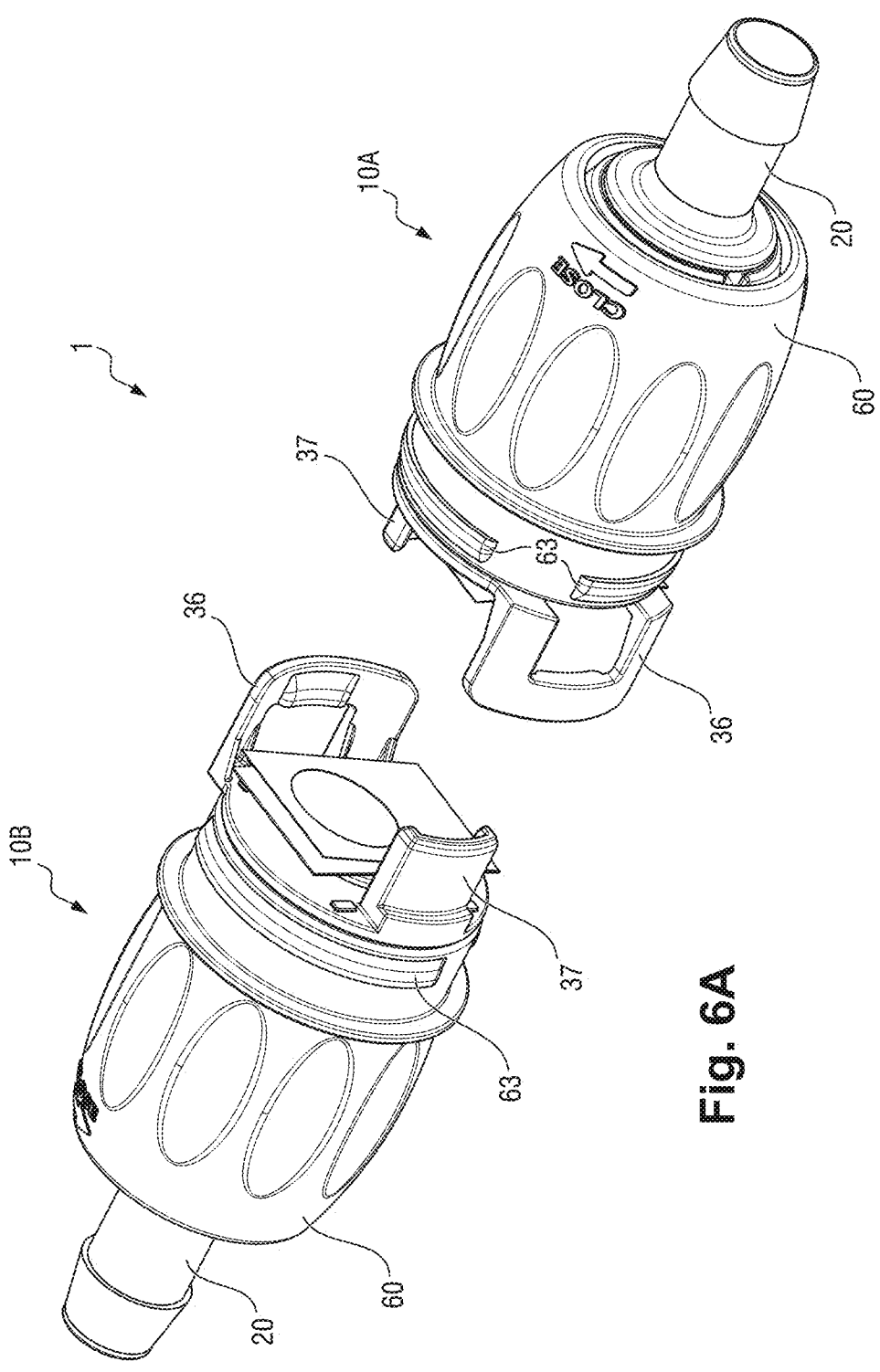
FIG. 6A is a perspective view of an aseptic junction assembly according to a particular embodiment of the invention, prior to connection.
Figure 6B:
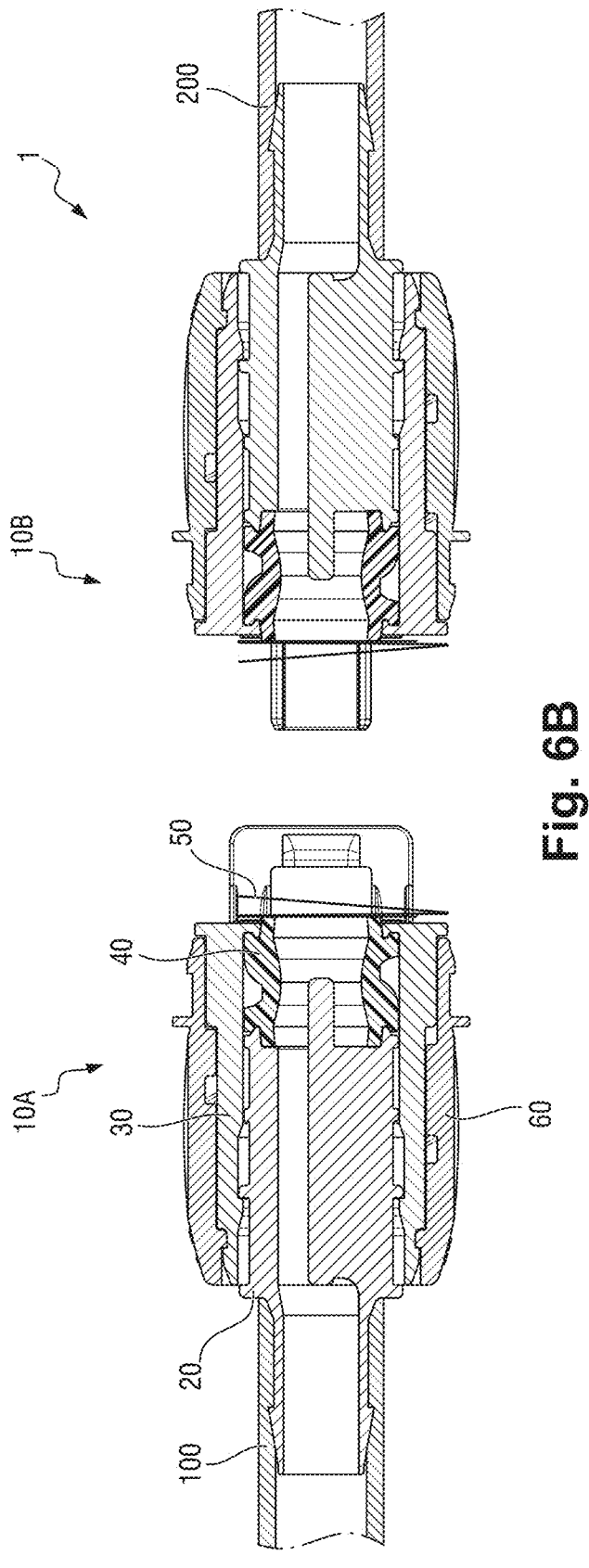
FIG. 6B is a cross-section view of the junction assembly shown in FIG. 6A.

The first and second devices 10A, 10B are then presented facing each other along a common axis, the first device 10A being turned through 180° about the axis relative to the second device 10B so that the assembly pin 37 and the slot 35.1 of the first device 10A are respectively facing the slot 35.1 and the assembly pin 37 of the second device 10B (FIGS. 6A and 6B).

In a first step, the first and second devices 10A, 10B are moved towards each other until the pull-tongues 51 of the first and second devices 10A, 10B are in contact, the slot 35.1 of the first device 10A then receiving a portion of the assembly pin 37 of the second device 10B and the slot 35.1 of the second device 10B receiving a portion of the assembly pin 37 of the first device 10A.

Figure 7A:
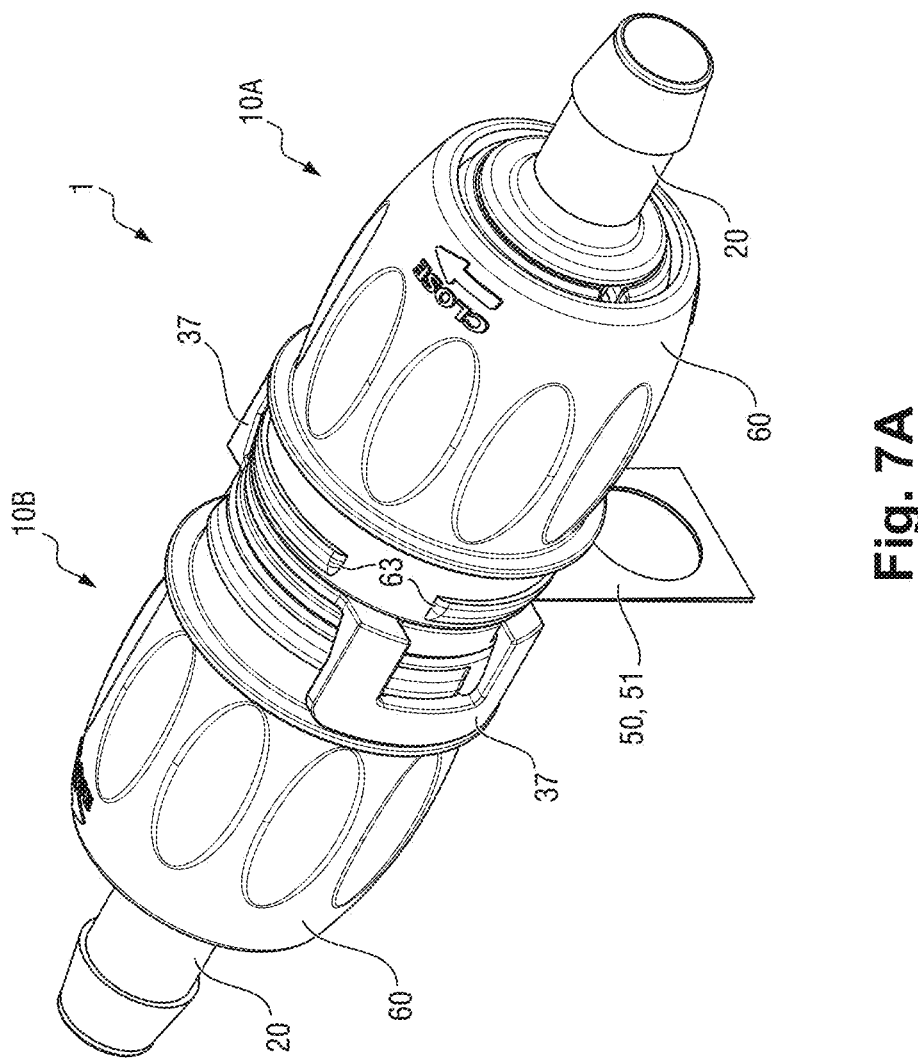
FIG. 7A is a view analogous to FIG. 6A after connection, before removing the protective film.
Figure 7B:
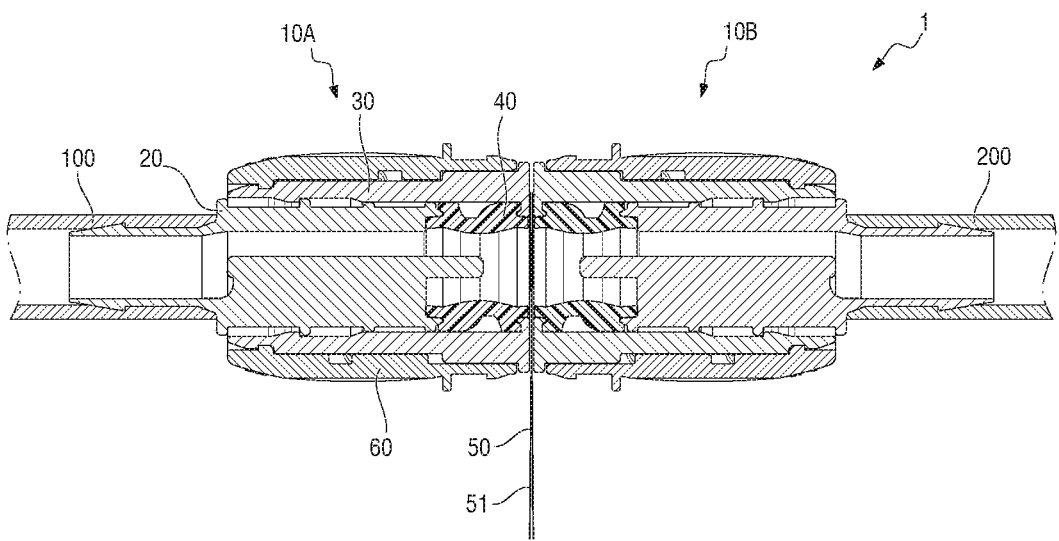
FIG. 7B is a cross-section view of the junction assembly shown in FIG. 7A.

By continuing to bring the first and second devices 10A, 10B closer together until the studs 35.2 of the front faces 35 are in contact with each other, the protective films 50 are pressed against each other, which causes a slight compression of an end portion of the sealing elements 40 projecting from said front face, but also a cooperation of the serration 36.1 of the locking tab 36 of the first device 10A with one of the collar portions 63 of the second device 10B and a cooperation of the serration 36.1 of the locking tab 36 of the second device 10B with one of the collar portions 63 of the first device 10A (FIGS. 7A and 7B). This is called coupling of the first and second devices 10A and 10B. The studs 35.2 define a slight clearance between the front faces 35, thereby preventing the protective films 50 from being pinched between said front faces 35.

Figure 8A:
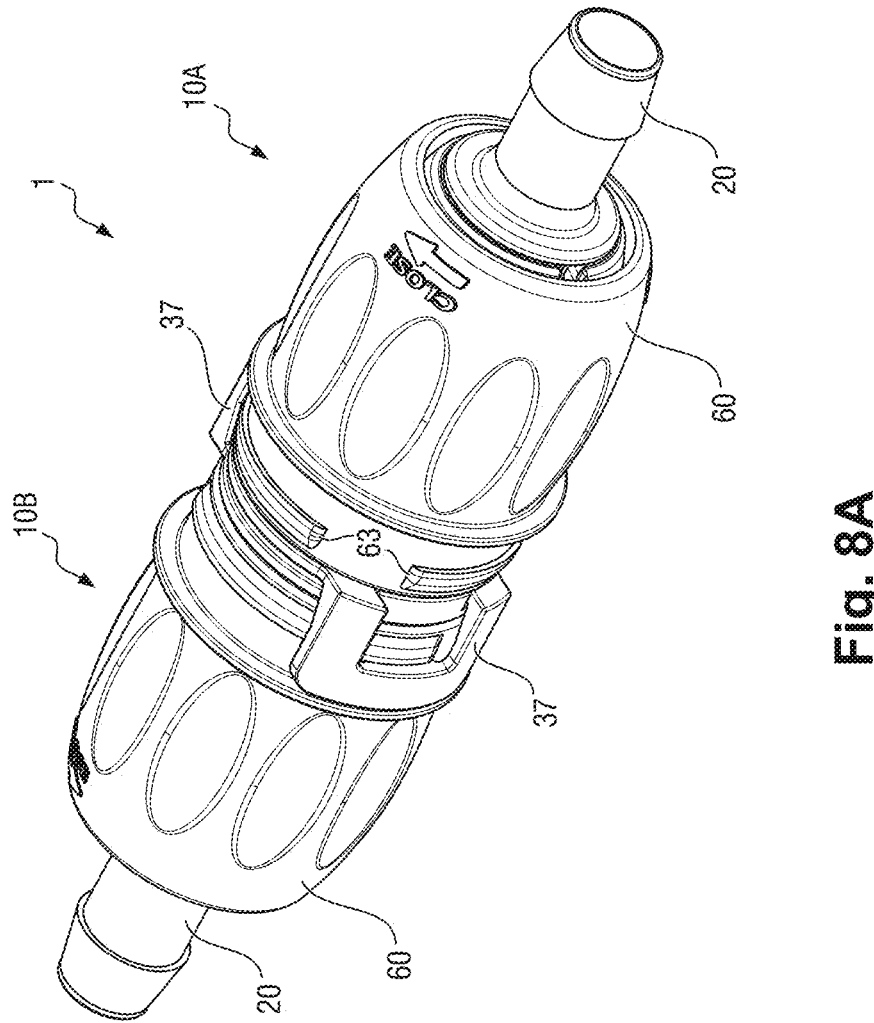
FIG. 8A is a view analogous to FIG. 6A after connection and after removing the protective film.
Figure 8B:
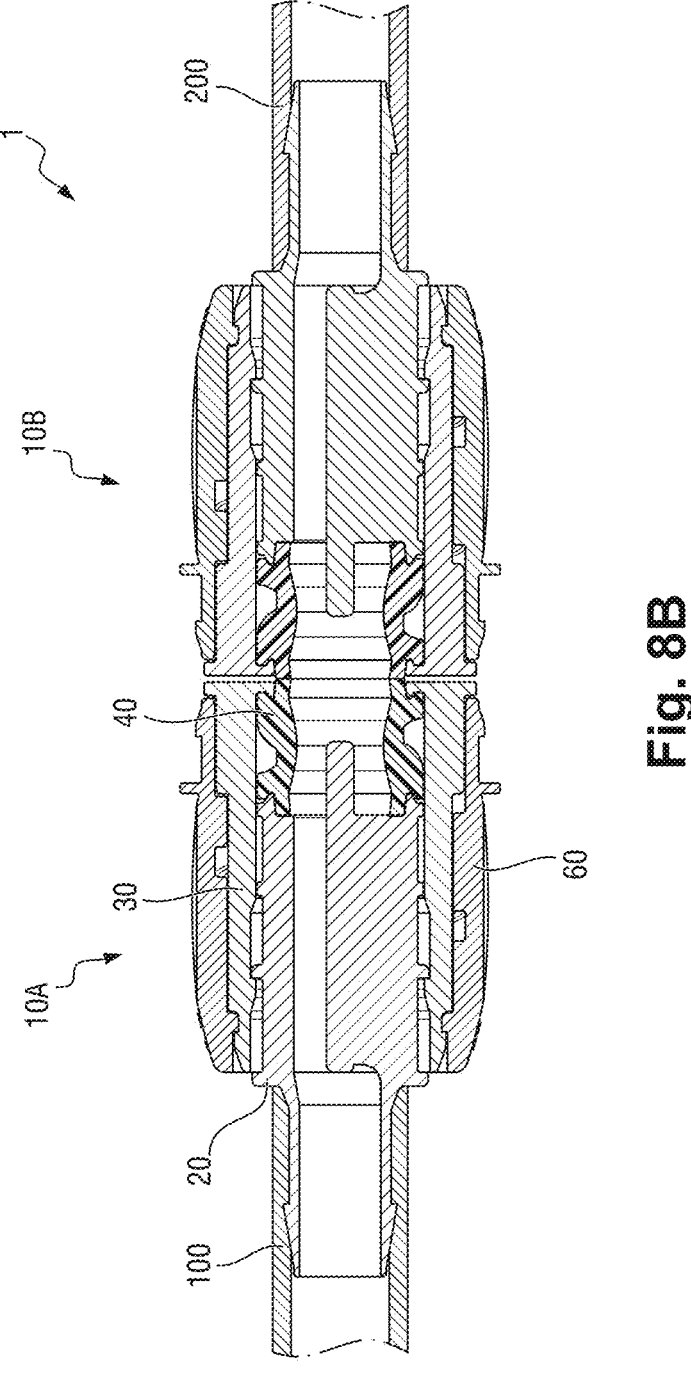
FIG. 8B is a cross-section view of the junction assembly shown in FIG. 8A.
Figure 9A:
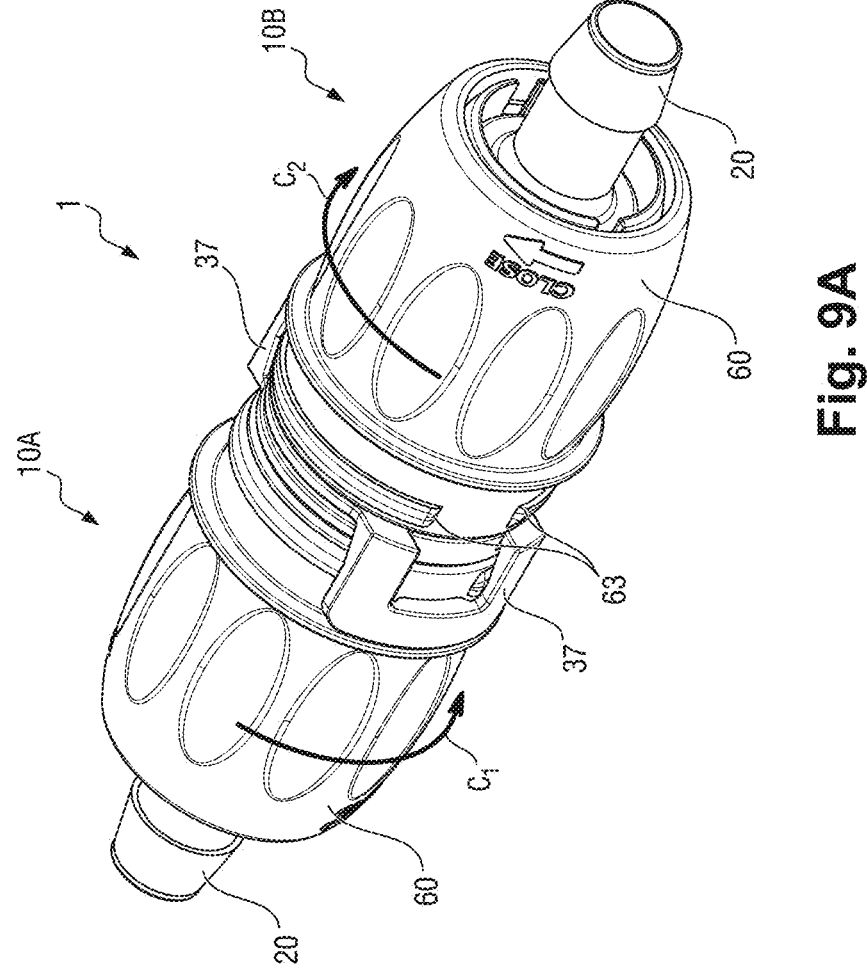
FIG. 9A is a view analogous to FIG. 6A during disconnection.
Figure 9B:
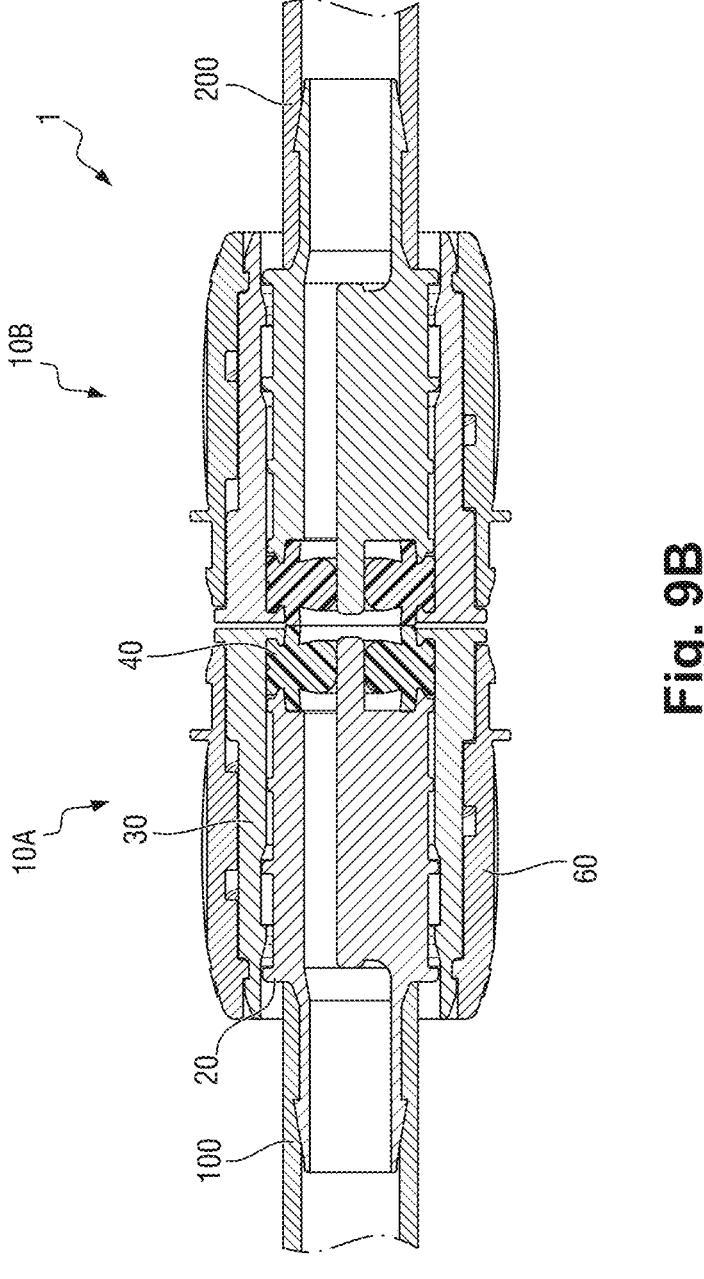
FIG. 9B is a cross-section view of the junction assembly shown in FIG. 9A.

The protective films 50 are then removed by passing the same finger through the holes 51.1 of the tongues 51 of the first and second devices 10A, 10B and by pulling simultaneously on said tongues 51, thereby decompressing the end portions of the sealing elements 40 and putting them into leaktight contact with each other (FIGS. 8A and 8B). The first and second devices 10A, 10B thus form a fluid flow channel between the first tube 100 and the second tube 200.

It will be understood that the slight clearance between the front faces 35 makes it possible to facilitate the removal of the protective films 50.

When it is appropriate to disconnect the first device 10A from the second device 10B, a rotational drive torque $C_1, C_2$ is exerted, preferably simultaneously, on each of the sleeves 60 so as to bring said sleeves 60 from the connection position to the disconnection position and thus axially move the bodies 30 of the first and second devices 10A, 10B from the projecting position to the flush position.

Once the bodies 30 are in a flush position (FIGS. 9A and 9B):

the arms 31.1 of the slots 31 oppose the axial movement of the bodies 30 towards the projecting position under the effect of the forces generated by the compression of the sealing elements 40;

the sealing elements 40 of the first and second devices 10A, 10B are sufficiently compressed to enclose the rods 25 of the inserts 20 so that the fluid can no longer flow between the first tube 100 and the second tube 200, and more particularly between the first device 10A and the second device 10B; and the locking tab 36 of the first device 10A is facing the release path delimited by the collar portions 63 equipping the sleeve 60 of the second device 10B, and the locking tab 36 of the second device 10B is facing the release path delimited by the collar portions 63 equipping the sleeve 60 of the first device 10A, so that said locking tabs 36 no longer oppose the disconnection of the first and second devices 10A, 10B.

The drive torques $C_1$ and $C_2$ exerted on the sleeves 60 of the first and second devices 10A, 10B are then stopped.

Figure 10A:
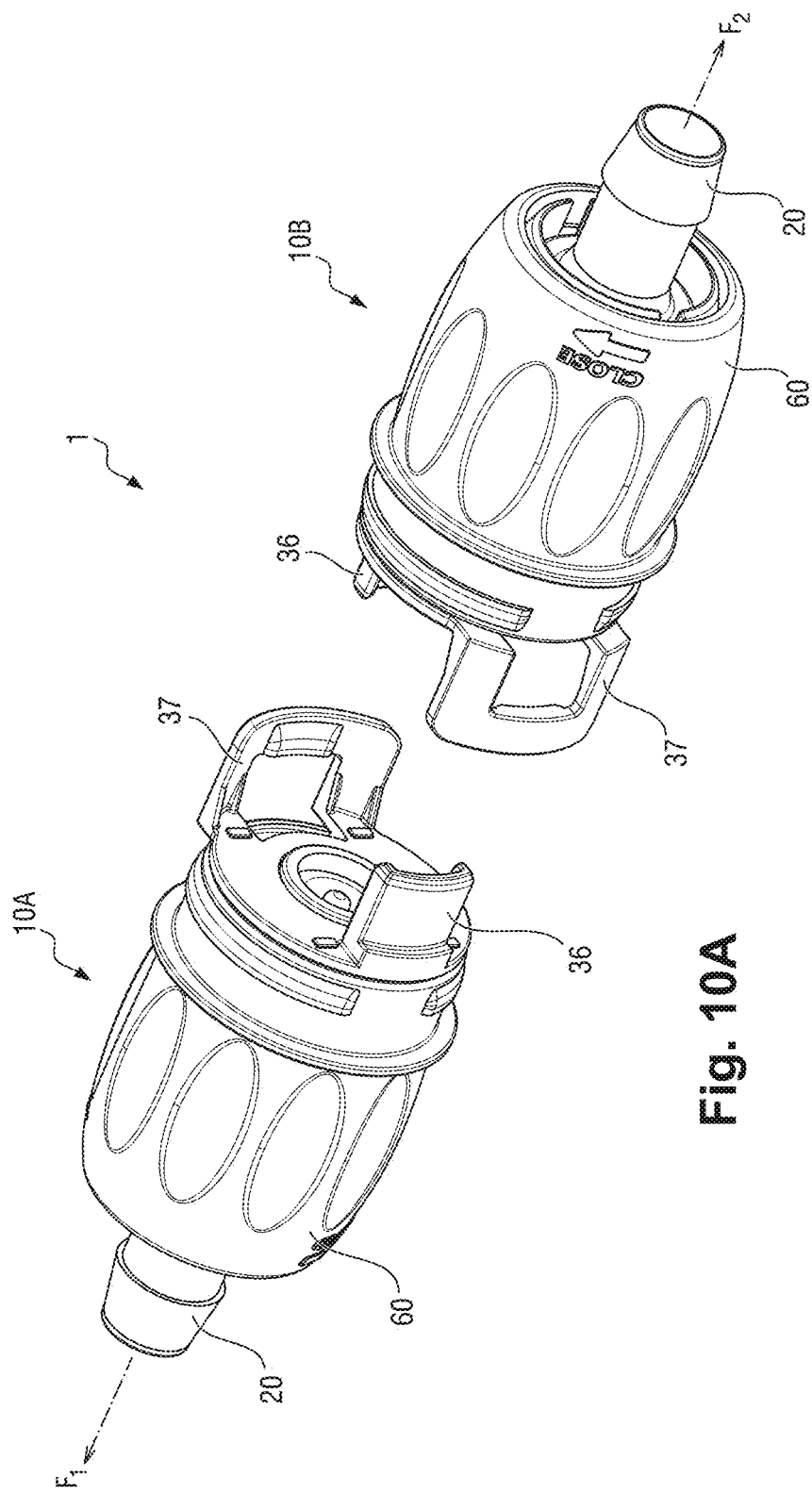
FIG. 10A is a view analogous to FIG. 6A after disconnection.
Figure 10B:
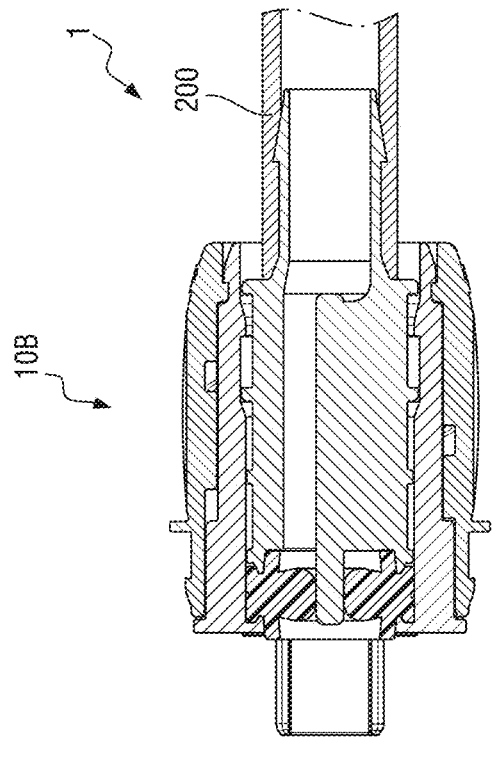
FIG. 10B is a cross-section view of the junction assembly shown in FIG. 10A.
Figure 10B:
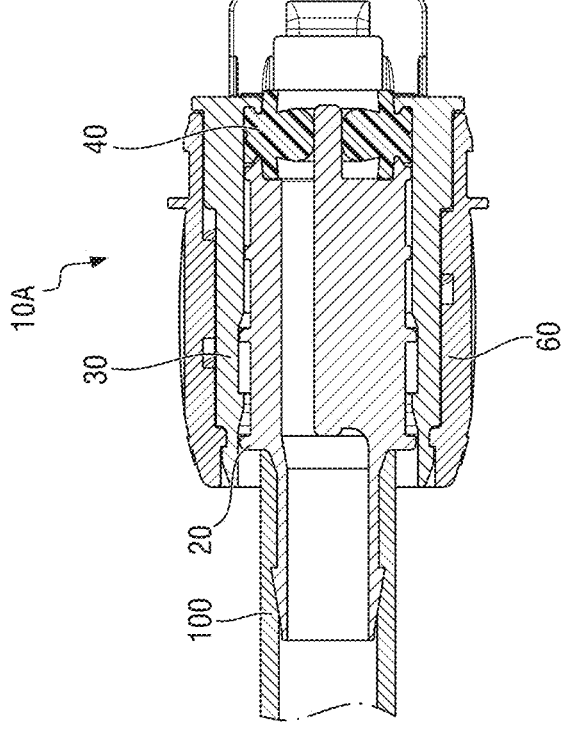

An axial force $F_1, F_2$ is then exerted on the sleeves 60 so as to separate the first device 10A and the second device 10B from each other (FIGS. 10A and 10B).

In order to protect the sealing elements 40 in their deformed state, the protective covers 70 are re-clipped onto the sleeves 60.

It will thus be understood that the enclosure of the rods 25 by the sealing elements 40 makes it possible to prevent any flow of fluid remaining trapped in the tubes 100, 200 when the devices 10A, 10B are disconnected.

It will also be understood that the disconnection of the first device 10A from the second device 10B is only possible after the rotation of the sleeves causing the movement of the bodies 30 from the projecting position to the flush position in which they are locked by the arms 31.1 of the slots 31, and therefore only after the rods 25 have been enclosed by the sealing elements 40, thereby avoiding any risk of human error.

Figure 11:
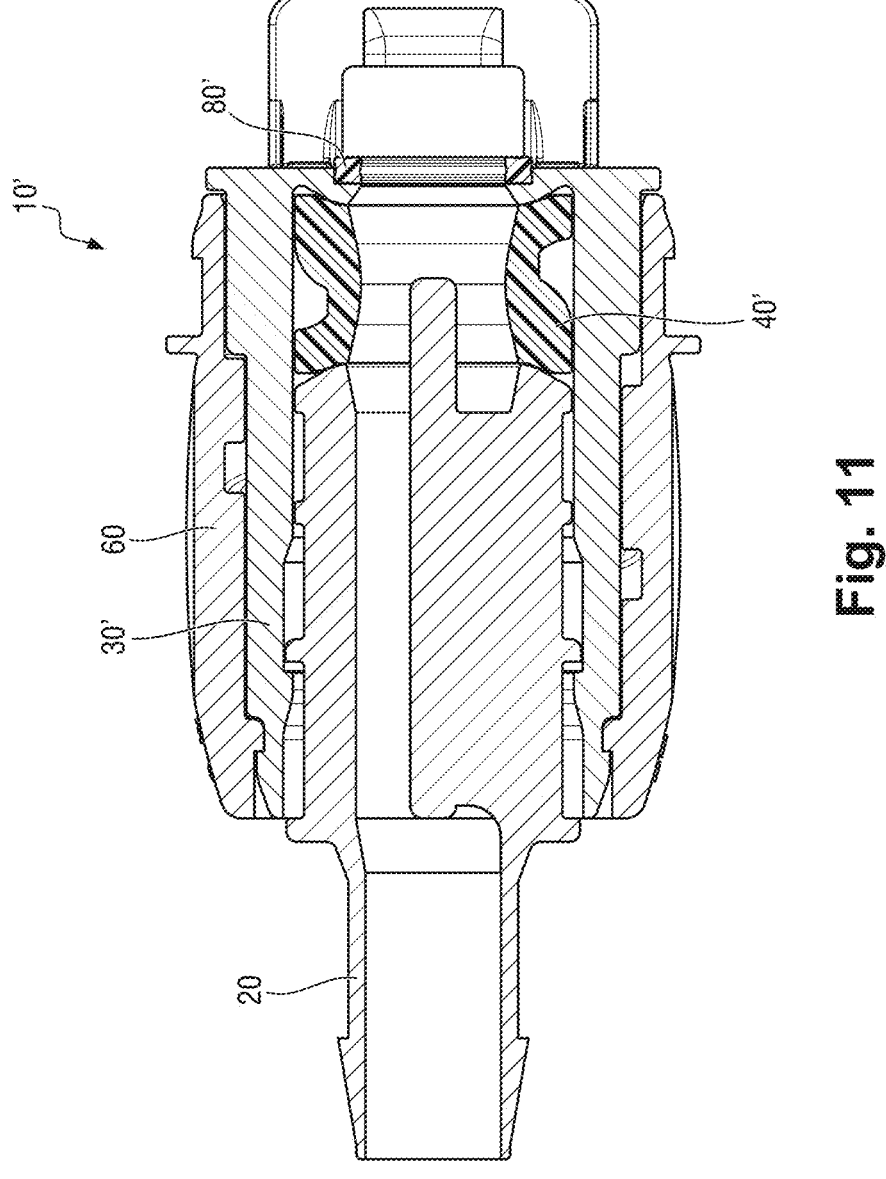
FIG. 11 is an axial section view of a variant of the junction device shown in FIG. 1, without its protective cover.

FIG. 11 shows a junction device 10' that is a variant of the junction device 10 shown in FIGS. 1 to 5.

The device 10' differs from the device 11 in that the sealing element 40 'does not project from the front face 35' of the body 30' and in that it comprises an annular seal 80' that is housed in a bore made in the front face 35' of the body 30' and that projects from said front face 35' to ensure sealing between the device 10' and another device 10'. It is understood that, unlike the sealing element 40, the sealing element 40' is arranged solely to prevent the flow of fluid through the device 10' when the body 30' is in flush position, and not to ensure sealing between the device 10' and another device 10'.

Naturally, the invention is not limited to the embodiment described, but covers any variant coming within the scope of the invention as defined by the claims.

Although the junction assembly comprises, in this case, two devices 10A, 10B that are identical, it could also comprise two devices that are different. For example, the locking tab 36 of the first device 10A may be replaced by an assembly pin and the assembly pin 37 of the second device 10B may be replaced by a locking tab so as to form a male connector and a female connector.

Although the devices 10A, 10B are, in this case, coupled together by clip fastening, they could equally well be coupled together by any other means such as screwing a portion of the device 10A onto the other device 10B.

Although the tubes 100, 200 are, in this case, anchored to the devices 10A, 10B by a conically-shaped projection, they could also be anchored by any other means such as a snap ring, a washer with external teeth, or elastically deformable arms.

Although the locking of the body 30 in the flush position is achieved, in this case, by the use of elastically deformable arms 31.1, it could also be achieved by any other means such as by the use of pegs.

Although the sealing element 40 is, in this case, symmetrical, it could be not symmetrical.

The rod 25 is optional, in particular when the channel defined by the insert 20 is of small diameter. The sealing element 40 in its deformed state then obstructs the channel in its entirety and alone.

The steps required for disconnecting the devices 10A, 10B may be performed simultaneously on each of the devices 10A, 10B, or they may be performed on one of the devices and then on the other.

The invention claimed is:

1. An aseptic junction device for a tube, comprising:

a tubular insert defining a channel and having a first end segment provided with means for connecting it to the tube and a second end segment which is intended to extend outside the tube;

an annular body comprising a first end segment mounted on the second end segment of the insert, and also a second end segment projecting axially from the second end segment of the insert to define therewith a housing;

an annular sealing element that is disposed in the housing between a front face of the second end segment of the insert and an internal step of the second segment of the annular body and that is deformable from a first state in which the sealing element delimits a fluid flow section and a second state in which the sealing element completely obstructs the channel, the sealing element being arranged to be brought from its first state to its second state under the effect of an axial compression; and means for coupling to another junction device, the first end segment of the body being mounted on the insert so as to be movable axially between an axially projecting position of the insert and in which the sealing element is in its first state, and a flush position with the insert in which the sealing element is sufficiently axially compressed to be in its second state, wherein:

a maneuvering sleeve is rotatably mounted on the body between a connection position and a disconnection position, and is coupled to the insert so that a rotation of the sleeve from the connection position to the disconnection position leads an axial movement of the body from the projecting position to the flush position; and the means for coupling are arranged to allow decoupling of the junction device and the another junction device, only when the sleeve is in the disconnection position.

2. The device according to claim 1, including locking means for locking the body in the flush position.

3. The device according to claim 1, wherein the sealing element comprises a front face projecting from the second segment of the annular body, and on which a protective film is removably fastened, the film having a pull-tongue folded down thereon with a first end connected to an edge of the protective film and a second end projecting from the edge of the film that is opposite the first end of the pull-tongue.

4. The device according to claim 1, wherein the first end segment of the body comprises a locking tab projecting from a front face of the body and including, at a free end, a serration intended to co-operate with an edge of the another junction device, and wherein one end of the sleeve is provided externally with at least one collar portion intended to co-operate with a locking tab of the another junction device, the collar portion and the locking tab forming the locking means.

5. The device according to claim 1, wherein the tubular insert is provided with a rod extending axially cantilevered into the channel to have a free end portion projecting from the second end section of the insert, the fluid flow section delimited by the sealing element in its first state being greater than a cross-section of the rod, and the sealing element in its second state enclosing the rod.

6. The device according to claim 1, wherein the rotation of the sleeve from the connection position to the disconnection position is substantially equal to 180 degrees.

7. A junction assembly of two tubes comprising the junction device and the another junction device according to claim 1.

8. The assembly according to claim 7, wherein the junction device and the another junction device are identical.

9. A method for disconnecting two tubes joined by means of a junction assembly according to claim 8, the method comprising the following steps:

bringing the sleeves of the two devices from the connection position to the disconnection position; and axially moving the devices away from each other.

* * * * *